United States Patent [19]

Kadono et al.

[11] Patent Number: 4,691,800
[45] Date of Patent: Sep. 8, 1987

[54] VEHICLE BODY FRAME FOR MOTORCYCLES

[75] Inventors: Kohji Kadono, Saitama; Minoru Tsunoda, Asaka, both of Japan

[73] Assignee: Honda Giken Kogyo Kabushiki Kaisha, Tokyo, Japan

[21] Appl. No.: 815,100

[22] Filed: Dec. 31, 1985

[51] Int. Cl.$^4$ ............................................. B62J 19/30
[52] U.S. Cl. ................................ 180/219; 280/281 R; 280/289 G; 293/105
[58] Field of Search ............... 180/219, 223, 225, 228; 280/281 R, 289 G, 289 R; 296/78.1; 293/105

[56] References Cited

U.S. PATENT DOCUMENTS

| | | | |
|---|---|---|---|
| 1,198,669 | 9/1916 | Schwinn | 180/219 |
| 1,941,801 | 1/1934 | Harley | 280/289 G |
| 2,171,042 | 8/1939 | Minton | 280/289 G X |
| 3,902,740 | 9/1975 | Lucier et al. | 280/289 G |
| 4,094,375 | 6/1978 | Doncque | 180/219 |
| 4,136,890 | 1/1979 | Vertucci | 296/78.1 X |
| 4,438,828 | 3/1984 | Nakagawa | 180/219 |
| 4,457,524 | 7/1984 | Yoshiwara | 180/219 |
| 4,545,200 | 10/1985 | Oike | 180/219 |
| 4,577,719 | 3/1986 | Nomura | 180/219 |

FOREIGN PATENT DOCUMENTS

| | | | |
|---|---|---|---|
| 1053224 | 9/1953 | France | 280/289 G |
| 270783 | 1/1930 | Italy | 180/219 |
| 294546 | 2/1954 | Switzerland | 293/105 |

Primary Examiner—John J. Love
Assistant Examiner—Mitchell J. Hill
Attorney, Agent, or Firm—Armstrong, Nikaido, Marmelstein & Kubovcik

[57] ABSTRACT

In a vehicle body frame for motorcycles of the type that a single-tube main frame extending from a head pipe to the rear of the vehicle body and a single-tube down frame extending downwards from the head pipe are connected with each other via a plurality of frame members, the down frame is detachably connected to the plurality of frame members by means of additional side frame members.

1 Claim, 3 Drawing Figures

VEHICLE BODY FRAME FOR MOTORCYCLES

BACKGROUND OF THE INVENTION

1. Field of the Invention

The present invention relates to a vehicle body frame structure for motorcycles, and more particularly to a vehicle body frame structure of the type that a single-tube main frame extending from a head pipe to the rear of the vehicle body and a single-tube down frame extending downwards from the head pipe are connected with each other via a plurality of frame members.

2. Description of the Prior Art

A vehicle body frame of a motorcycle is a basic structure of a vehicle having a role of carrying an engine, a power transmission, various equipments, a rider, a load and the like and connecting front and rear wheels with each other, and especially, since a front portion of the vehicle body frame is the most important part which supports an engine and a full tank and is connected to a steering head, sufficient strength and rigidity are required for the front portion of the vehicle body.

Hence, in the case of a high speed motor cycle or a racing motorcycle in which a heavy load is applied to the vehicle body frame, often a cradle type frame, that is, a frame having a shape similar to a cradle for carrying an engine is employed, and the cradle type frames are further classified into a double cradle type frame in which two down frame tubes connected to a head pipe are disposed in parallel to each other, and a semi-double cradle type frame in which a single-tube down frame connected to a head pipe is branched into two tubes in the midway.

However, especially in the case of a motorcycle for running on an irregular ground, for the purpose of stably maintaining a riding attitude by clamping a fuel tank with rider's both knees upon running on an irregular ground, the width of the fuel tank is made narrow, and consequently, it is necessary to narrow the gap space between inner side walls of a fuel tank having an inverse-U-shaped cross-section configuration to a minimum by employing the semi-double cradle type frame in which the main frame is formed of a single tube and thereby assure a fuel tank capacity. In other words, if the main frame is made narrow in width, then reasonably the capacity of the fuel tank can be increased. However, in order to assure the strength and rigidity of the vehicle body frame, the narrowing in width of the main frame would be naturally limited.

SUMMARY OF THE INVENTION

One object of the present invention is to provide a novel vehicle body frame for motorcycles in which the strength and rigidity can be improved while realizing a sufficiently narrow width of the main frame.

The above-mentioned object of the present invention can be achieved in a vehicle body frame for motorcycles consisting of a single-tube main frame, a single-tube down-frame and a plurality of frame members for connecting the main frame with the down frame, by detachably connecting the down frame with the plurality of frame members by means of additional frame members.

More particularly, by adopting the additional frame members, the vehicle body frame can be reinforced in strength and rigidity against a bending load applied to the vehicle body frame in the widthwise direction of the vehicle body, and as a result, the main frame can be formed as narrow as possible in width.

DESCRIPTION OF THE PREFERRED EMBODIMENT

Now, descirption will be made on one preferred embodiment of the present invention illustrated in FIGS. 1 to 3.

Figure 1:
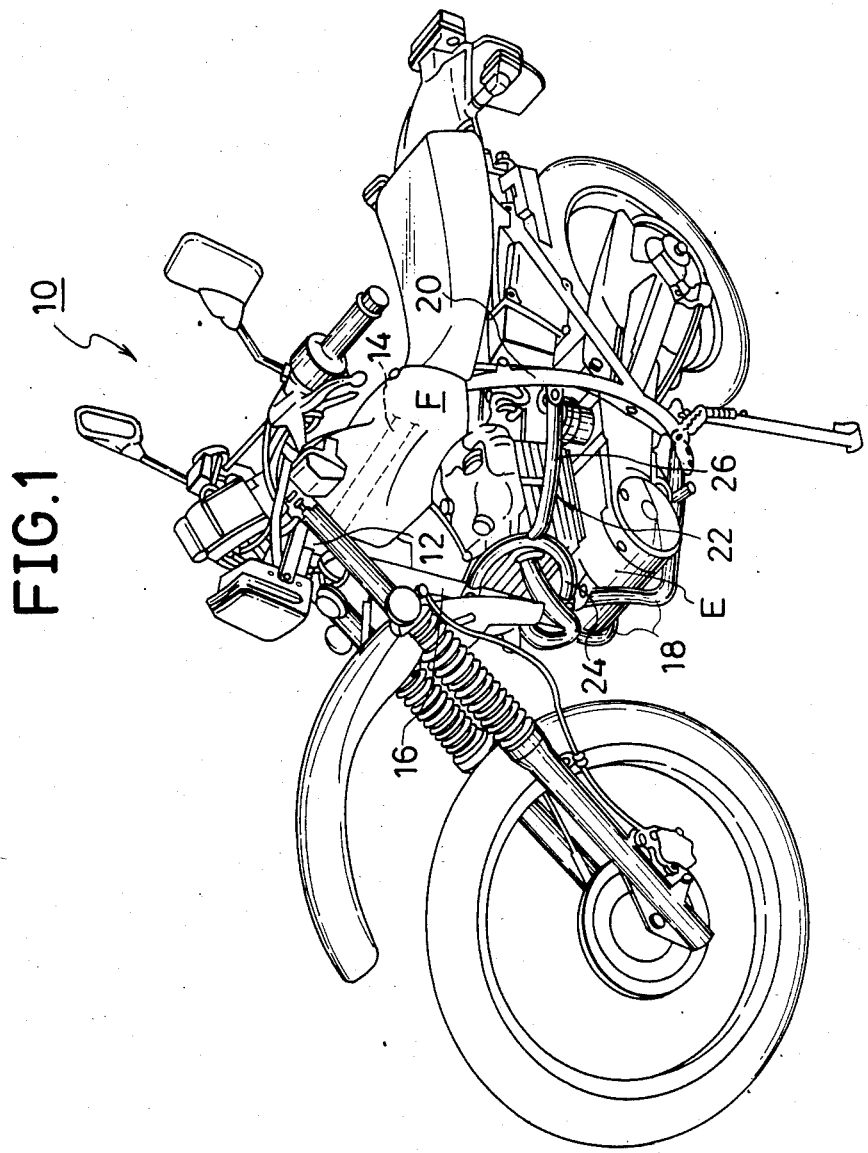
FIGS. 1 and 2 are schematic perspective views of a motorcycle employing a vehicle body frame according to one preferred embodiment of the present invention as viewed from an obliquely left forward direction and from a right forward direction, respectively.
Figure 2:
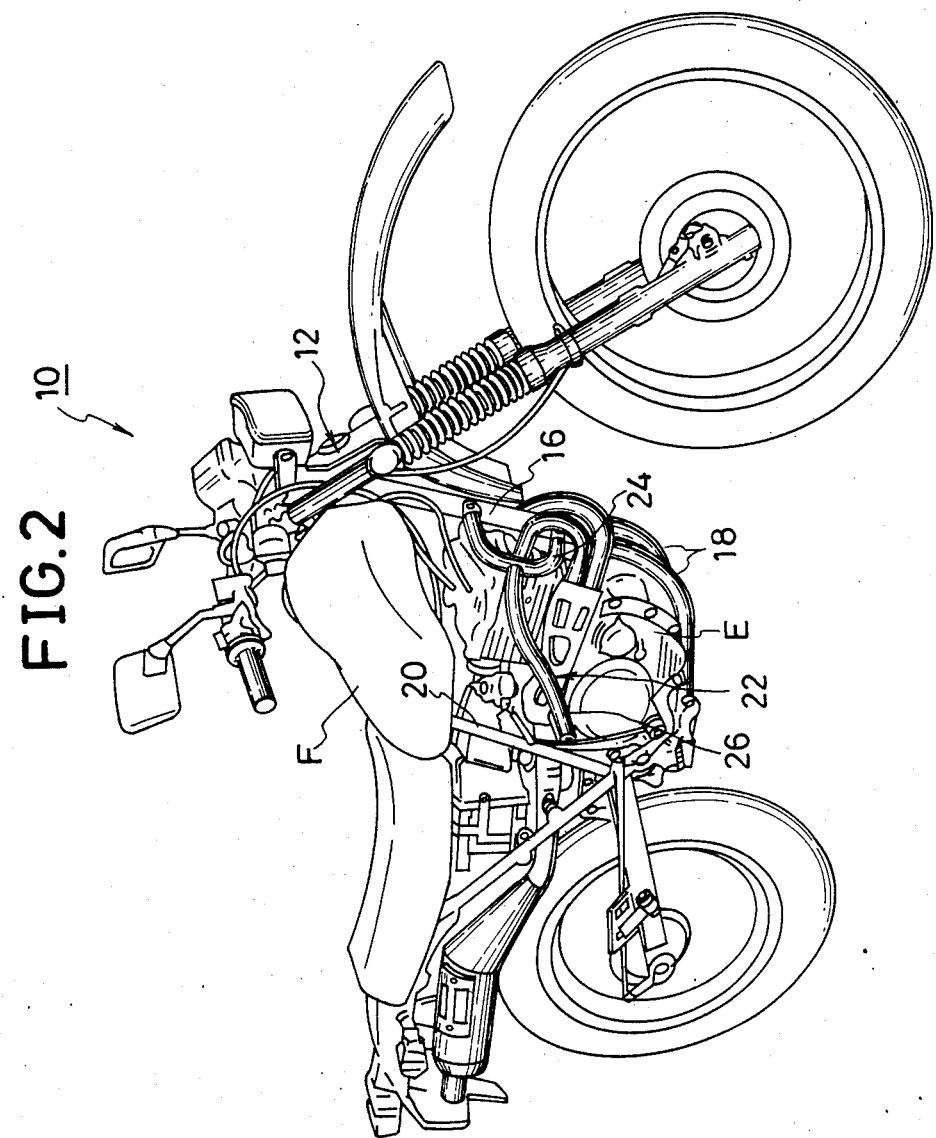
Figure 3:
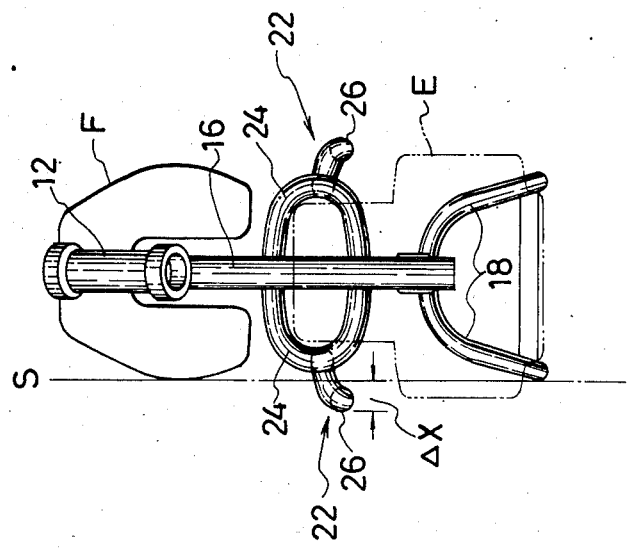
FIG. 3 is a conceptional front view of an essential part of the same motorcycle.

FIGS. 1 and 2 are perspective views of a motorcycle 10 as viewed from an obliquely left forward direction and from an obliquely right forward direction, respectively, in which the vehicle body frame is formed principally of a head pipe 12, a single-tube main frame 14 extending from the head pipe 12 to the rear of the vehicle body, a single-tube down frame 16 extending downwards from the head pipe 12 in front of an engine E, a pair of left and right bottom frames 18 branched from the bottom end of the down frame 16 and extending to the rear of the vehicle body at a level lower than the engine E and a pair of left and right center pillers 20 extending downwards from the rear end portion of the main frame 14 and connected to the respective bottom frames 18.

In addition, the down frame 16 is detachably connected with the left and right center pillers 20, respectively, by means of side frames 22, 22 having a nearly Y-shaped configuration, respectively. More particularly, the side frame 22 has a forked portion 24 at its front end secured to the down frame 16 by means of bolts and has a rear end portion of its single pillar section 26 secured to the center pillar 20 by means of bolts. Since the side frame 22 surrounds the front surface and the side surface of the engine E, it is flexed outwards of the vehicle body as a whole, and as best seen in FIG. 3, at least a part of the single pillar section 26 is located outside of a vertical plane S that is tangential to an outer surface of a fuel tank F. The distance of projection $\Delta X$ of the single pillar section 26 from the plane S is selected within the range such that the single pillar section 26 may not come into contact with a rider's leg.

The illustrated embodiment is constructed as described above, and owing to the fact that in the vehicle body frame for the motorcycle 10, the down frame 16 and the center pillar 20 are connected by means of the outwardly flexed side frame 22, the vehicle body frame can be reinforced in strength and rigidity against a bending load applied to the vehicle body frame in the lateral direction (in the widthwise direction of the vehicle body), as a result it becomes possible to reduce a width dimension of the main frame 14 to a minimum, hence the gap space between the inner side walls of the fuel tank having an inverse-U-shaped cross-section configuration can be made sufficiently narrow, and thereby increase of the capacity of the fuel tank can be realized.

Moreover, since the connections of the side frame 22 to the down frame 16 and the center pillar 20 employ a connecting structure making use of bolts, upon loading the engine E on the vehicle body frame the loading operation will not be hindered by the side frame 22, and it is only necessary that the side frame 22 should be mounted after the engine E has been loaded and the side frame 22 should be dismount upon unloading the engine from the vehicle body frame for the purpose of adjustment and maintenance.

As will be obvious from the above description, according to the present invention, owing to the fact that in a vehicle body structure of a motorcycle of the type that a single tube main frame and a single-tube down frame are connected with each other via a plurality of frame members the down frame and the plurality of frame members are detachably connected with each other by means of additional frame members, the vehicle body frame is reinforced against a load applied thereto from the lateral direction (the widthwise direction of the vehicle body), hence it becomes possible to reduce the width dimension of the main frame as compared to that in the prior art, as a result a capacity of a fuel tank having a narrow width can be increased, and also the additional frame members positioned outside of the engine has a function of protecting the engine from an external force.

What is claimed is:

1. A vehicle body frame for a motorcycle having an engine comprising a single-tube main frame extending from a head pipe to the rear of the vehicle body, a single-tube down frame extending downwardly from said head pipe, a pair of center pillars extending downwardly from said main frame rearwardly of an engine, a pair of bottom frame members connecting the lower end of said down frame with the lower ends of said center pillars and extending under said engine and a pair of detachably connected side frame members having a forked portion at their front ends connecting with said down frame and at its rear ends connecting with said center pillars outwardly of said engine and inwardly of a rider's legs.

* * * * *